(12) United States Patent
Nakamura et al.

(10) Patent No.: US 10,773,572 B2
(45) Date of Patent: Sep. 15, 2020

(54) UTILITY VEHICLE

(71) Applicant: KAWASAKI JUKOGYO KABUSHIKI KAISHA, Kobe-shi, Hyogo (JP)

(72) Inventors: Kenta Nakamura, Kobe (JP); Naoki Hashimoto, Kakogawa (JP); Dexter Spitsnogle, Raymond, NE (US)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 7 days.

(21) Appl. No.: 16/229,267

(22) Filed: Dec. 21, 2018

(65) Prior Publication Data

US 2020/0198446 A1 Jun. 25, 2020

(51) Int. Cl.
 *B60J 1/02* (2006.01)
 *B60J 10/70* (2016.01)
 *B62D 21/18* (2006.01)
 *B62D 25/08* (2006.01)
 *B60J 1/00* (2006.01)

(52) U.S. Cl.
 CPC .............. *B60J 1/02* (2013.01); *B62D 21/183* (2013.01); *B60J 1/004* (2013.01); *B60J 10/70* (2016.02); *B60Y 2200/20* (2013.01); *B62D 25/081* (2013.01)

(58) Field of Classification Search
 CPC ..... B60J 1/02; B60J 1/006; B60J 10/25; B60J 10/70; B62D 21/183; B62D 25/08; B62D 25/081; B62D 25/14; B60Y 2200/20; B60H 1/0055; B60H 1/00571
 USPC ..... 296/192, 200, 201, 208, 190.1, 84.1, 90, 296/93
 See application file for complete search history.

(56) References Cited

U.S. PATENT DOCUMENTS

| 3,037,810 | A | * | 6/1962 | Kelley | B60J 10/70 52/208 |
| 3,637,254 | A | * | 1/1972 | Lapointe | B60J 10/70 296/96.21 |
| 4,343,503 | A | * | 8/1982 | Samuelson | B60J 1/02 296/96.21 |
| 4,477,507 | A | * | 10/1984 | Kunert | B60J 10/24 428/122 |
| 4,650,240 | A | * | 3/1987 | Rinella | B60J 10/70 296/93 |

(Continued)

*Primary Examiner* — Gregory A Blankenship
(74) *Attorney, Agent, or Firm* — Alleman Hall Creasman & Tuttle LLP

(57) ABSTRACT

A utility vehicle comprises a vehicle body frame including: right and left side frame sections, a cabin frame section surrounding a riding space where seats are provided, a cross frame section extending in a rightward and leftward direction at a location that is forward of the seats and connecting the side frame sections to each other, and a front frame section supporting a hood at a location that is forward of the cross frame section; a frame upper cover section disposed rearward of the hood and covering the cross frame section from above; and a windshield assembly which is detachably mountable on the vehicle body frame, at a location that is forward of the seats. A groove extending in the rightward and leftward direction is provided in an upper surface of the frame upper cover section, and a lower end portion of the windshield assembly is disposed at the groove.

8 Claims, 8 Drawing Sheets

(56) References Cited

U.S. PATENT DOCUMENTS

| | | | | |
|---|---|---|---|---|
| 5,083,835 | A | * | 1/1992 | Rossini .................. B60J 10/24 296/201 |
| 6,340,200 | B1 | * | 1/2002 | Enomoto ................ B60R 21/34 296/187.04 |
| 9,776,481 | B2 | | 10/2017 | Deckard et al. |
| 2012/0223500 | A1 | * | 9/2012 | Kinsman ................. B60G 3/20 280/124.153 |
| 2013/0033070 | A1 | * | 2/2013 | Kinsman ............. B62D 21/183 296/190.03 |
| 2014/0060953 | A1 | * | 3/2014 | Wetterlund ............ B60K 26/02 180/233 |
| 2014/0265285 | A1 | * | 9/2014 | Erspamer ............. B60N 2/6009 280/783 |
| 2015/0047917 | A1 | * | 2/2015 | Burt, II ............. B62D 25/2036 180/292 |
| 2018/0244133 | A1 | * | 8/2018 | Luo ........................ B60J 1/006 |
| 2020/0198446 | A1 | * | 6/2020 | Nakamura ................ B60J 1/02 |

\* cited by examiner

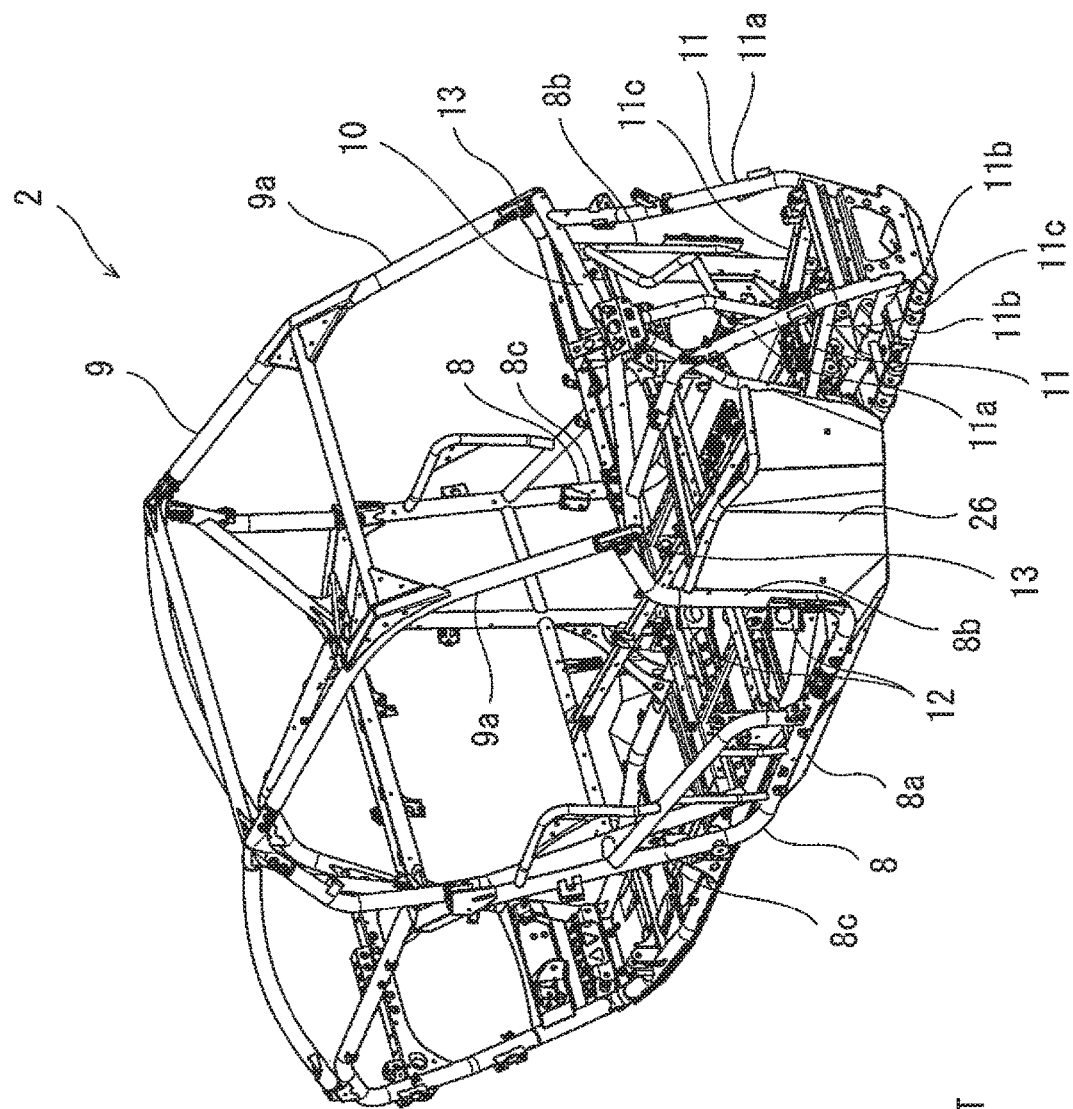
Fig. 2
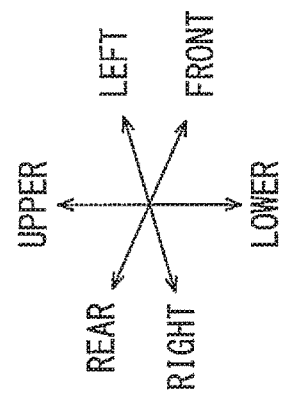

UTILITY VEHICLE

BACKGROUND OF THE INVENTION

Field of the Invention

The present invention relates to a utility vehicle.

Description of the Related Art

For example, U.S. Pat. No. 9,776,481B2 discloses a four-wheel-drive utility vehicle which is able to travel off-road (travel on an uneven road surface). This utility vehicle includes a vehicle body frame supported by a pair of front wheels and a pair of rear wheels, and including a plurality of frame portions, and a plurality of frame covers covering a part of the plurality of frame portions.

A windshield assembly is detachably (removably) mountable on this utility vehicle. The windshield assembly serves to suppress wind from entering a riding space (seating area) where a driver seat and a passenger seat are provided, while the vehicle is traveling. The windshield assembly includes a transparent windshield member, an upper seal, a lower seal, and a pair of side seals, which cover the edges of the transparent windshield member, a plurality of clamps, and a lower contoured portion. The plurality of clamps retain the pair of side seals, grip and clamp the vehicle body frame. The lower contoured portion includes an upper edge which is engageable with the lower seal, and a lower contoured surface corresponding to a contoured surface of the frame cover located forward of the riding space. The lower contoured surface has a shape corresponding to the shape of the contoured surface of the frame cover located forward of the riding space. In this configuration, a gap is not provided between the frame cover located forward of the riding space and the windshield member.

However, in this configuration, since the lower contoured portion with a complex structure is disposed at a location which is forward of the riding space and is easily seen and noticed by a person, the external appearance of the whole of the utility vehicle is degraded.

SUMMARY OF THE INVENTION

In view of the above-described circumstances, an object of the present invention is to make the lower end portion of a windshield assembly less noticeable in a utility vehicle in a state in which the windshield assembly is mounted on a vehicle body frame.

According to an aspect of the present invention, a utility vehicle comprises a vehicle body frame including: a pair of right and left side frame sections extending in a forward and rearward direction, on right and left sides of a riding space where a driver seat and a passenger seat are provided, a cabin frame section surrounding the riding space at a location that is above the pair of right and left side frame sections, a cross frame section extending in a rightward and leftward direction at a location that is forward of the driver seat and the passenger seat and connecting the pair of right and left side frame sections to each other, and a front frame section supporting a hood at a location that is forward of the cross frame section; a frame upper cover section disposed rearward of the hood and covering the cross frame section from above; and a windshield assembly which is detachably mountable on the vehicle body frame, at a location that is forward of the driver seat and the passenger seat, wherein a groove extending in the rightward and leftward direction is provided in an upper surface of the frame upper cover section, and wherein a lower end portion of the windshield assembly is disposed at the groove.

In accordance with this configuration, in the utility vehicle in a state in which the windshield assembly is mounted on the vehicle body frame, the lower end portion of the windshield assembly can be made less noticeable.

The above and further objects, features and advantages of the present invention will more fully be apparent from the following detailed description of preferred embodiment with reference to the accompanying drawings.

BRIEF DESCRIPTION OF THE DRAWINGS

FIG. 2 is a perspective view showing a frame structure of the utility vehicle of FIG. 1.

DETAILED DESCRIPTION OF THE PREFERRED EMBODIMENTS

Hereinafter, the embodiment of the present invention will be described with reference to the drawings. The stated directions are from the perspective of a driver or passenger riding in a utility vehicle 1.

Figure 1:
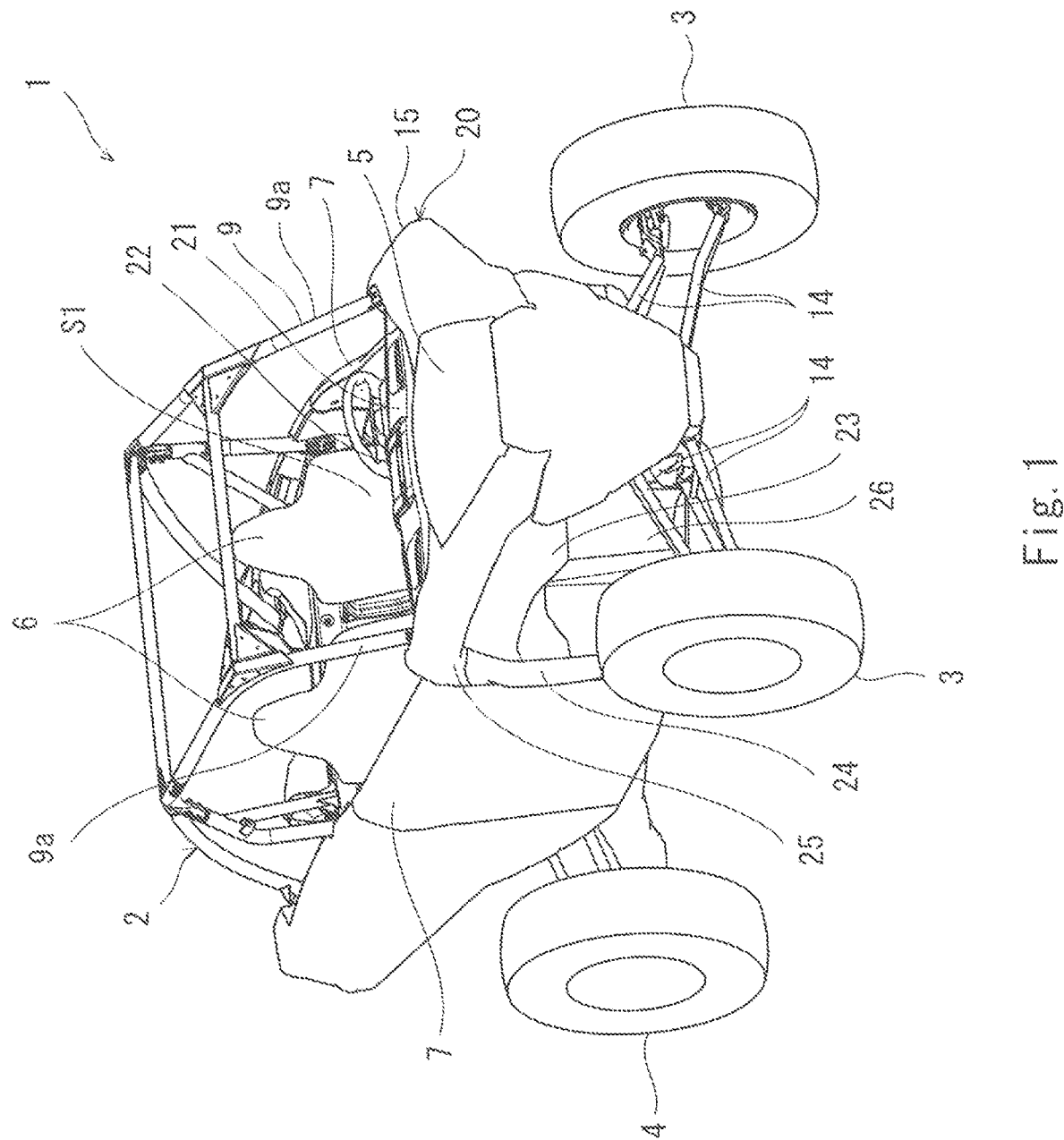
FIG. 1 is a perspective view showing a utility vehicle according to an embodiment.

FIG. 1 is a perspective view showing the utility vehicle 1 according to the embodiment. FIG. 2 is a perspective view showing a frame structure of the utility vehicle 1 of FIG. 1. As shown in FIGS. 1 and 2, the utility vehicle 1 includes a pair of right and left front wheels 3 supported by the front portion of a vehicle body frame 2, and a pair of right and left rear wheels 4 supported by the rear portion of the vehicle body frame 2. A space formed between the right and left front wheels 3 is covered by a resin-made hoof 5 from above. A pair of seats 6 (a driver seat and a passenger seat) are disposed at locations that are rearward of the hood 5 and are in the vicinity of a center of the vehicle body frame 2 in a forward and rearward direction. The pair of seats 6 are disposed in a side-by-side arrangement. At least one resin-made door 7 is provided on right and left sides of the seats 6 to allow a driver and a passenger to get into and off the utility vehicle 1 through the door 7.

The vehicle body frame 2 includes a plurality of frame sections which are a pair of right and left side frame sections 8, a cabin frame section 9, a cross frame section 10, a pair of right and left front frame sections 11, and the like. The vehicle body frame 2 is a pipe frame comprised of a plurality of pipe members which are connected to each other.

The pair of right and left side frame sections 8 extend in the forward and rearward direction, on right and left sides of a riding space S1 in which the seats 6 (the driver seat 6 and the passenger seat 6) are provided. More specifically, each of the pair of right and left side frame sections 8 includes a center extension part 8a extending in the forward and rearward direction, at a location that is under the door 7, a front extension part 8b extending upward from the front end portion of the center extension part 8a at a location that is forward of the door 7, and a rear extension part 8c extending upward from the rear end portion of the center extension part 8a at a location that is rearward of the door 7. The front extension part 8b is provided with a plurality of (two in FIG. 2) door hinges 12 supporting the door 7 so that the door 7 is rotatable.

The cabin frame section 9 is disposed to surround the riding space S1 at a location that is above the pair of right and left side frame sections 8. The cabin frame section 9 includes a pair of right and left front pillar parts 9a. The pair of right and left front pillar parts 9a extend downward while being slightly inclined to the front, from locations that are above the seats 6 and the doors 7. A windshield assembly 40 which will be described later is mounted on the pair of right and left front pillar parts 9a.

The cross frame section 10 extends in a rightward and leftward direction (vehicle width direction) at a location that is forward of the seats 6. Cabin frame support parts 13 are provided on right and left end portions, respectively, of the cross frame section 10, and protrude upward from the cross frame section 10. The lower end portions of the front pillar parts 9a are fastened to the cabin frame support parts 13, respectively, by use of, for example, bolts. Specifically, the cross frame section 10 is connected to the cabin frame section 9 via the cabin frame support parts 13. The upper end portions of the front extension parts 8b are fastened to the cabin frame support parts 13, respectively, by use of, for example, bolts. In other words, the cross frame section 10 is also connected to the pair of right and left side frame sections 8 via the cabin frame support parts 13.

The pair of right and left front frame sections 11 are disposed to be spaced apart from each other in the rightward and leftward direction. Each of the pair of right and left front frame sections 11 includes an upper extension part 11a extending forward from the cross frame section 10 while being inclined in a downward direction, a lower extension part 11b extending rearward from the lower end portion of the upper extension part 11a, a center extension part 11c extending rearward from the upper extension part 11a at a location that is above the lower extension part 11b, and the like. The upper extension parts 11a of the pair of right and left front frame sections 11 support the hood 5 at locations that are forward of the cross frame section 10. Below the hood 5, each of the front wheels 3 is connected to the corresponding lower extension part 11b and the corresponding center extension part 11c by use of a plurality of arms 14.

As shown in FIG. 1, a part of the plurality of frame sections included in the vehicle body frame 2 are covered by a plurality of frame covers 20. Each of the plurality of frame covers 20 is constituted by one or a plurality of resin-made panels. Alternatively, each of the plurality of frame covers 20 may include a panel other than the resin-made panel, such as a metal-made panel. The plurality of frame covers 20 include a frame upper cover section 21, a dash cover section 22, a pair of right and left tire upper cover sections 23, a pair of right and left lower side cover sections 24, a pair of right and left upper side cover sections 25, and the like.

Figure 3:
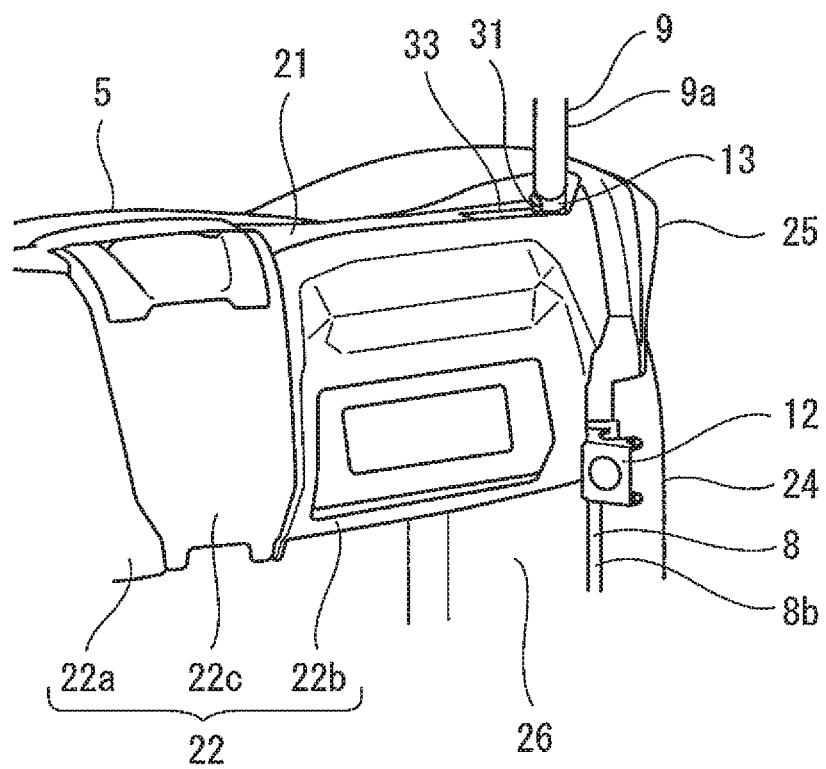
FIG. 3 is a view showing a dash cover section and a region which is in the vicinity of the dash cover section, when viewed from seats (a driver seat and a passenger seat) of the utility vehicle of FIG. 1.

FIG. 3 is a view showing the dash cover section 22 and a region which is in the vicinity of the dash cover section 22, when viewed from the seats 6 of the utility vehicle 1 of FIG. 1. As shown in FIG. 3, the frame upper cover section 21 is disposed rearward of the hood 5. The frame upper cover section 21 is disposed to cover the cross frame section 10 (see FIG. 2) from above. The frame upper cover section 21 is secured to the cross frame section 10. A dimension in the rightward and leftward direction, of the frame upper cover section 21, is larger than that of the cross frame section 10. Openings 31 are provided at right and left end portions of the frame upper cover section 21 (see FIG. 5). The cabin frame support parts 13 protruding upward from the cross frame section 10 pass through the openings 31, respectively. Note that the lower end portion of the windshield assembly 40 which will be described later is configured to contact the upper surface of the frame upper cover section 21. The frame upper cover section 21 will be described in detail later.

The dash cover section 22 is disposed to face the seats 6 (see FIG. 1) in the forward and rearward direction, at a location that is forward of the seats 6. The dash cover section 22 is disposed to cover the cross frame section 10 from the rear. In the present embodiment, the dash cover section 22 includes a left dash panel 22a disposed to face the driver seat 6, a right dash panel 22b disposed to face the passenger seat 6, and a center dash panel 22c disposed between the left dash panel 22a and the right dash panel 22b. The upper end portions of the dash panels 22a to 22c are coupled to the rear end portion of the frame upper cover section 21.

The pair of right and left tire upper cover sections 23 (see FIG. 1) are disposed at locations that are forward of the dash cover section 22 and above the front wheels 3. Floor guards 26 are provided at the lower edges of the pair of right and left tire upper cover sections 23, respectively. The floor guards 26 are made of metal and serve to protect the riding space S1. Each of the pair of right and left tire upper cover sections 23 and each of the floor guards 26 face the corresponding front wheel 3. FIG. 2 shows a state in which the floor guards 26 are mounted on the vehicle body frame 2.

The pair of right and left lower side cover sections 24 cover the front extension parts 8b, respectively, of the pair of right and left side frame sections 8, from the side. Each of the pair of right and left upper side cover sections 25 covers the corresponding cabin frame support part 13 and the corresponding front frame section 11, from the side, at a location that is above the corresponding one of the pair of right and left lower side cover sections 24.

Figure 4:
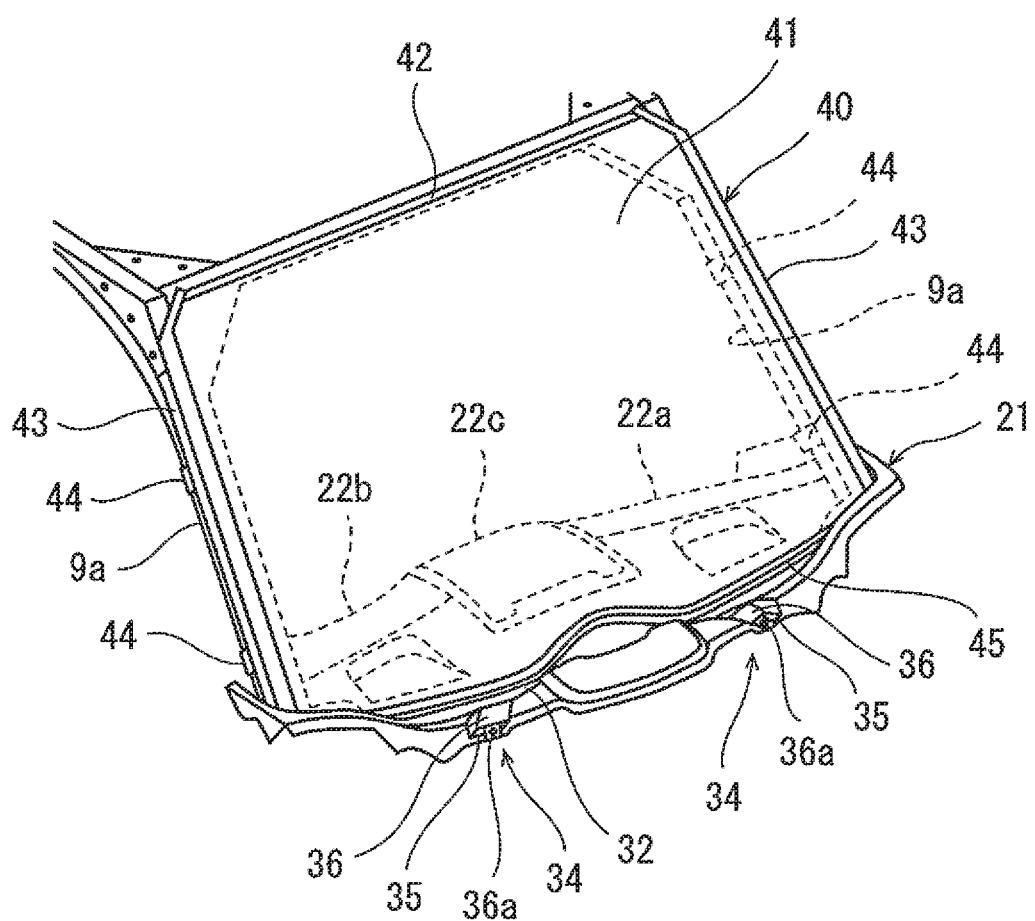
FIG. 4 is a perspective view showing a windshield assembly mounted on a vehicle body frame of the utility vehicle of FIG. 1 and a region which is in the vicinity of the windshield assembly.

FIG. 4 is a perspective view showing the windshield assembly 40 mounted on the vehicle body frame 2 of the utility vehicle 1 of FIG. 1 and a region which is in the vicinity of the windshield assembly 40. In FIG. 4, the hood 5, the upper side cover sections 25, and the like are omitted. As shown in FIG. 4, the windshield assembly 40 is detachably (removably) mountable on the vehicle body frame 2, at a location that is forward of the seats 6. The windshield assembly 40 mounted on the vehicle body frame 2 serves to suppress the wind from entering the riding space S1 through a space formed between the pair of right and left front pillar parts 9a while the utility vehicle 1 is traveling.

The windshield assembly 40 includes a windshield member 41, an upper seal (not shown), an upper mount 42, a pair of right and left side seals (not shown), a pair of right and left side mounts 43, a plurality of (four in the example of FIG. 4) clamps 44, and a lower seal 45. The windshield member 41 is a transparent member made of a resin or glass. The windshield member 41 has a plate shape and a substantially rectangular shape. The upper seal covers the upper edge of the windshield member 41. The upper mount 42 retains the upper edge of the windshield member 41. Specifically, the upper mount 42 retains the upper edge of the windshield member 41 by covering the upper seal covering the upper edge of the windshield member 41, from the outer side. The pair of right and left side seals cover the right edge and left edge, respectively, of the windshield member 41.

The pair of right and left side mounts 43 retain the right edge and left edge, respectively, of the windshield member 41. Specifically, the pair of right and left side mounts 43 retain the right edge and left edge, respectively, of the windshield member 41, by covering the pair of right and left side seals covering the right edge and left edge, respectively, of the windshield member 41, from the outer side.

Each of the pair of right and left side mounts 43 is provided with the two clamps 44. The two clamps 44 are configured to grip and clamp each of the front pillar parts 9a of the cabin frame section 9.

The lower seal 45 covers the lower edge of the windshield member 41. The lower seal 45 is configured to contact the upper surface of the frame upper cover section 21. Specifically, a groove 32 extending in the rightward and leftward direction is formed in the upper surface of the frame upper cover section 21. The lower seal 45 which is the lower end portion of the windshield assembly 40, is disposed at the groove 32.

Figure 5:
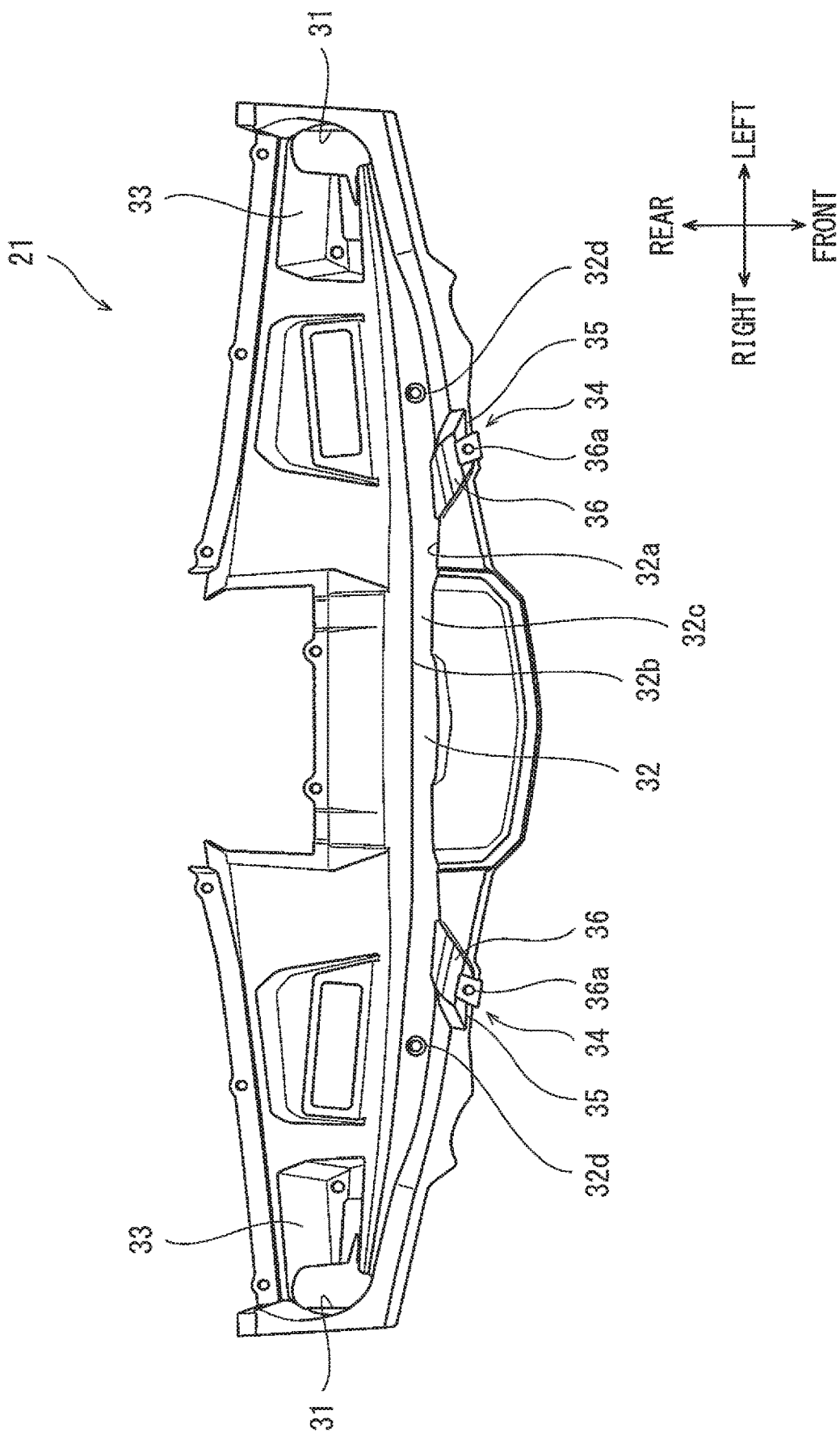
FIG. 5 is a top plan view showing a frame upper cover section of FIG. 4.

FIG. 5 is a top plan view showing the frame upper cover section 21 of FIG. 4. As shown in FIG. 5, the frame upper cover section 21 is provided with depressed (recessed) parts 33 which are depressed in the downward direction, at right and left end portions thereof. The depressed parts 33 have the above-described openings 31, respectively. The groove 32 extends in the rightward and leftward direction, from one of the two openings 31 provided on the right and left sides, to the other. The groove 32 includes a front wall 32a, a rear wall 32b, and a bottom wall 32c. The front wall 32a and the rear wall 32b face each other in the forward and rearward direction, and the bottom wall 32c connects the lower end portion of the front wall 32a and the lower end portion of the rear wall 32b to each other (see FIG. 7 in addition to FIG. 5). The bottom wall 32c is formed with a plurality of bolt holes 32d into which bolts are inserted to fasten to the frame upper cover section 21 to the cross frame section 10.

The frame upper cover section 21 is provided with two discharge parts 34 to discharge water such as rain water in the groove 32 to an outside region. Each of the two discharge parts 34 includes a discharge opening 35 disposed forward of the groove 32, and a discharge passage 36 extending from the groove 32 to the corresponding discharge opening 35. The two discharge openings 35 are spaced apart from each other in the rightward and leftward direction. The discharge openings 35 are disposed at locations that are closer to a center in the rightward and leftward direction than the right and left ends of the groove 32 (the discharge openings 35 are located inward of the right and left ends of the groove 32 in the rightward and leftward direction). In the present embodiment, the discharge openings 35 are formed by the front edge of the frame upper cover section 21.

Each of the discharge passages 36 is provided with a mounting hole 36a in a bottom wall thereof, to allow a fastening member such as a pop rivet to be inserted therethrough to mount the corresponding upper side cover section 25 to the frame upper cover section 21. In the present embodiment, a portion of the frame upper cover section 21 which is located forward of the groove 32, is covered by the pair of right and left upper side cover sections 25 and the hood 5, from above. In particular, when the utility vehicle 1 is viewed from above (in a top plan view), the discharge openings 35 and the discharge passages 36 are disposed to overlap with the pair of right and left upper side cover sections 25 and the hood 5 so that the discharge openings 35 and the discharge passages 36 are less noticeable.

Figure 6:
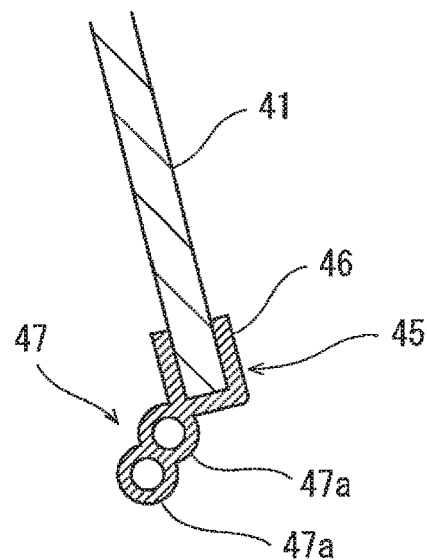
FIG. 6 is a partial side cross-sectional view showing the lower end portion of the windshield assembly of FIG. 4.

FIG. 6 is a partial side cross-sectional view showing the lower end portion of the windshield assembly 40 of FIG. 4. As shown in FIG. 6, the lower seal 45 includes a retaining part 46 with a U-shaped cross-section, covering the lower edge of the windshield member 41. The lower seal 45 includes a stress mitigation (relaxation) structure 47 for mitigating a stress generated between the lower seal 45 and the frame upper cover section 21. The stress mitigation structure 47 protrudes rearward and downward from the retaining part 46. The stress mitigation structure 47 is elastically deformed by a stress applied thereto. In the present embodiment, the stress mitigation structure 47 is provided at a corner portion where the lower surface and rear surface of the retaining part 46 cross each other. The stress mitigation structure 47 includes at least one tubular part 47a, preferably, a plurality of (e.g., two) tubular parts 47a. The tubular part(s) 47a has/have a ring-shape in a side view (when viewed from the side).

Figure 7:
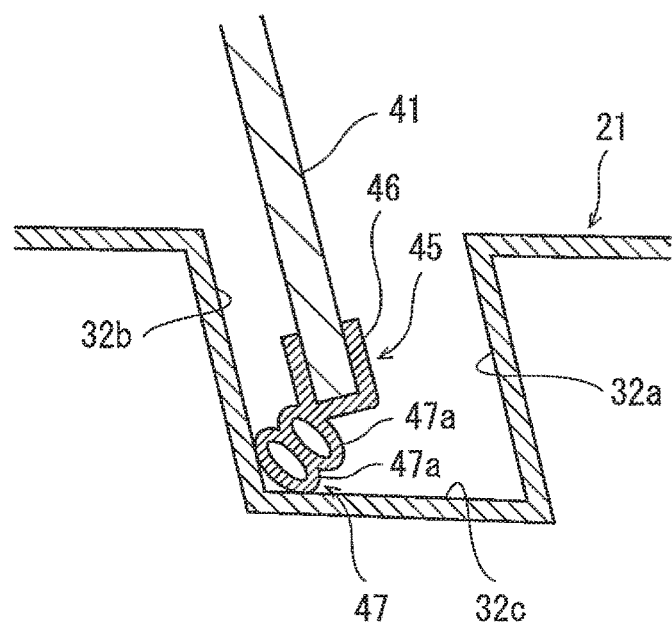
FIG. 7 is a partial side cross-sectional view showing the lower end portion of the windshield assembly mounted on the vehicle body frame of the utility vehicle of FIG. 1.

FIG. 7 is a partial side cross-sectional view showing the lower end portion of the windshield assembly 40 mounted on the vehicle body frame 2 of the utility vehicle 1 of FIG. 1. As shown in FIG. 7, the windshield assembly 40 is mounted on the vehicle body frame 2 in such a way that the plurality of clamps 44 (see FIG. 4) grip and clamp the cabin frame section 9 in a state in which the lower seal 45 is in contact with the rear wall 32b of the groove 32, from the front and/or from above. When the windshield assembly 40 (see FIG. 4) is mounted on the vehicle body frame 2, the tubular part(s) 47a of the stress mitigation structure 47 is/are deformed (compressed) by the stress applied by the groove 32. This makes it possible to mitigate the stress generated between the lower seal 45 and the groove 32. The dimension in the forward and rearward direction, of the groove 32, is larger than that of the lower seal 45 so that the lower end portion of the windshield assembly 40 can be easily accommodated in the groove 32. In other words, there is a clearance between the lower seal 45 and the front wall 32a of the groove 32, in a state in which the lower seal 45 is in contact with the rear wall 32b of the groove 32.

Although in the present embodiment, the tubular part(s) 47a of the stress mitigation structure 47 is/are configured to contact both of the rear wall 32b and the bottom wall 32c of the groove 32, for example, the tubular part(s) 47a may be configured to contact only one of the rear wall 32b and the bottom wall 32c of the groove 32. The configuration of the stress mitigation structure 47 is not limited to this so long as the stress mitigation structure 47 is deformed by a stress applied thereto. For example, the stress mitigation structure 47 may include only one tubular part 47a, or the plurality of tubular parts 47a may be continuous with the retaining part 46. The stress mitigation structure 47 may have, for example, a columnar shape, or a dome shape, instead of the tubular shape. Further, the stress mitigation structure 47 may not be provided at the corner portion where the lower surface and rear surface of the retaining part 46 cross each other, and may be provided at only one of the lower surface and rear surface of the retaining part 46.

Figure 8:
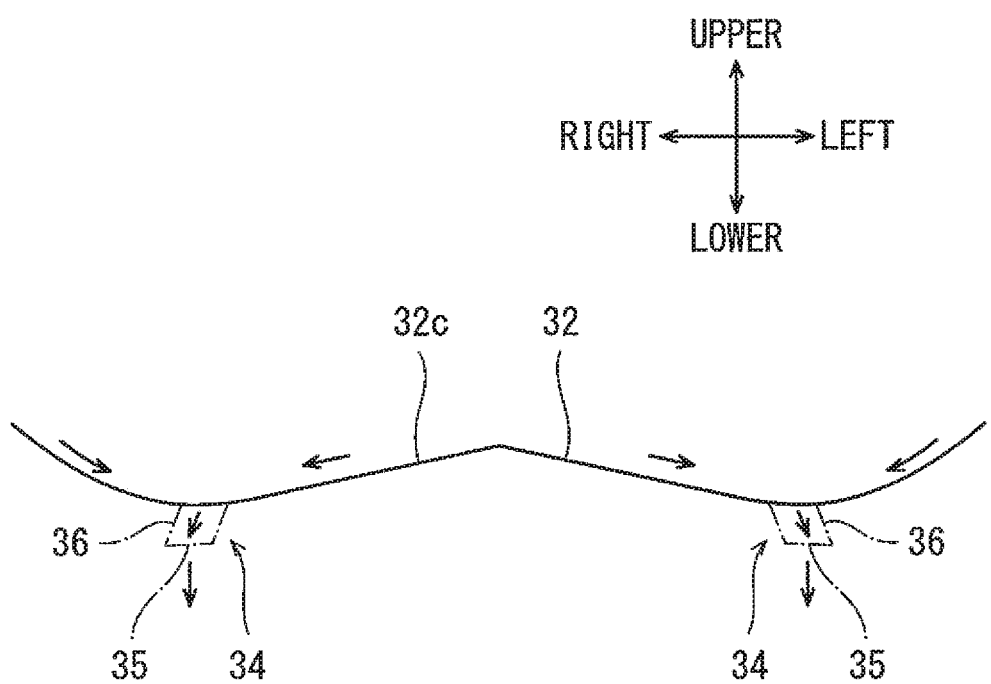
FIG. 8 is a longitudinal sectional view showing a bottom wall of a groove of the frame upper cover section of FIG. 5, which is taken along the extension direction of the bottom wall.

FIG. 8 is a longitudinal sectional view showing the bottom wall 32c of the groove 32 of the frame upper cover section 21 of FIG. 5, which is taken along the extension direction of the bottom wall 32c. As shown in FIG. 8, the bottom wall 32c is inclined in the downward direction, toward the discharge parts 34, to be precise, connection locations where the groove 32 is connected to the discharge passages 36. The bottom surfaces of the discharge passages 36 are also inclined in the downward direction, from the connection locations where the groove 32 is connected to the discharge passages 36, toward the discharge openings 35. In this structure, as indicated by arrows of FIG. 8, the water in the groove 32 flows on the bottom wall 32c to the locations where the groove 32 is connected to the discharge passages 36, and then reaches the discharge openings 35 through the discharge passages 36. Through the discharge openings 35, the water in the groove 32 is discharged to a region that is below the frame upper cover section 21.

Figure 9:
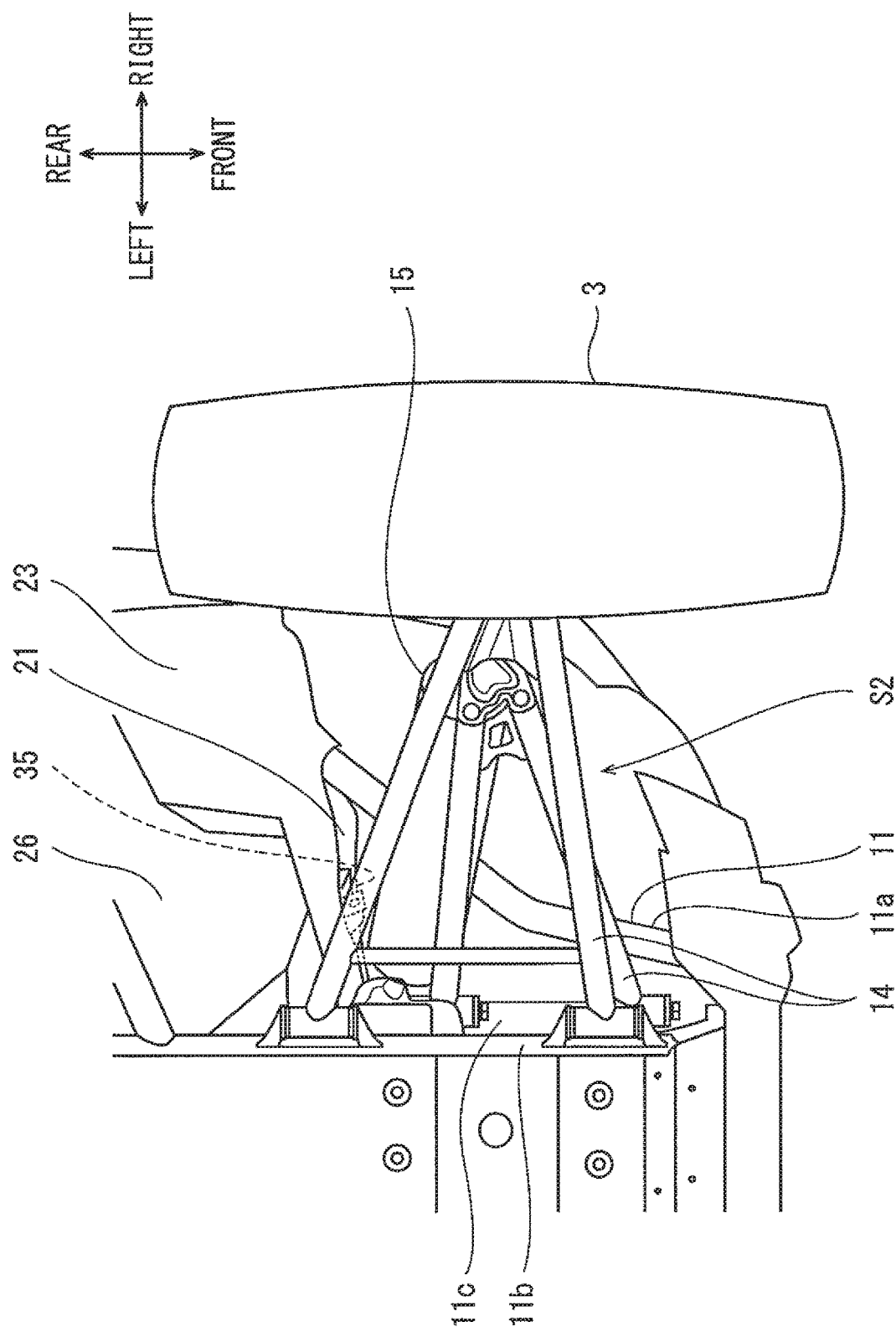
FIG. 9 is a partially enlarged bottom view showing a front wheel of the utility vehicle of FIG. 1 and a region which is in the vicinity of the front wheel, when viewed from a lower side (when viewed from the bottom).

FIG. 9 is a partially enlarged bottom view showing the front wheel 3 of the utility vehicle 1 of FIG. 1 and a region which is in the vicinity of the front wheel 3, when viewed from a lower side (when viewed from the bottom). As shown in FIG. 9, each of the front wheels 3 is connected to the corresponding front frame section 11 by a plurality of arms 14 and a suspending device 15. Each of the discharge openings 35 is disposed to overlap with a space S2 in which the plurality of arms 14 and the suspending device 15 are accommodated, when viewed from the lower side (from the bottom).

As described above, in the present embodiment, the lower end portion of the windshield assembly 40 is disposed at the groove 32 extending in the rightward and leftward direction, which is formed in the upper surface of the frame upper cover section 21. Therefore, it becomes possible to make the lower end portion of the windshield assembly 40 less noticeable, in the utility vehicle 1 in a state in which the windshield assembly 40 is mounted on the vehicle body frame 2.

The frame upper cover section 21 is provided with the discharge parts 34 including the discharge openings 35 through which the water in the groove 32 is discharged to a region that is below the frame upper cover section 21. Therefore, it becomes possible to prevent accumulation of the water in the groove 32.

Since the bottom wall 32c of the groove 32 is inclined in the downward direction, toward the discharge parts 34, the water in the groove 32 flows along the inclined bottom wall 32c toward the discharge parts 34. In this way, the water in the groove 32 can be easily discharged.

The discharge parts 34 include the discharge passages 36, respectively, extending from the groove 32 to the discharge openings 35, and the discharge openings 35 are disposed at the locations that are closer to the center in the rightward and leftward direction than the right and left ends of the groove 32 and that are forward of the groove 32. Thus, a structure for avoiding the water discharged through the discharge openings 35 from entering the riding space S1 can be easily designed.

Each of the discharge openings 35 is disposed to overlap with the space S2 in which the suspending device 15 connecting the front wheel 3 to the front frame section 11 is accommodated, in a plan view. Thus, the structure for avoiding the water discharged through the discharge opening 35 from entering the riding space S1 can be easily designed.

The lower seal 45 includes the stress mitigation (relaxation) structure 47 for mitigating a stress generated when the lower seal 45 contacts the wall surface forming the groove 32. This makes it possible to improve the durability of the windshield assembly 40.

The windshield assembly 40 is mounted on the vehicle body frame 2 in such a way that the plurality of clamps 44 grip and clamp the cabin frame section 9 in a state in which the lower seal 45 is in contact with the rear wall 32b of the groove 32, from the front. This makes it possible to eliminate a need for a structure for fastening the lower end portion of the windshield assembly 40 to the upper surface of the frame upper cover section 21. Therefore, cost of the windshield assembly 40 can be reduced. In addition, since it is not necessary to perform work for fastening the lower end portion of the windshield assembly 40 to the upper surface of the frame upper cover section 21. As a result, the windshield assembly 40 can be easily mounted on and demounted from the vehicle body frame 2.

The dimension in the forward and rearward direction, of the groove 32, is larger than that of the lower seal 45, and a clearance is provided between the lower seal 45 and the front wall 32a of the groove 32, in a state in which the lower seal 45 is in contact with the rear wall 32b of the groove 32. Therefore, even in a case where the frame upper cover section 21 or the windshield assembly 40 has a dimension error, the lower end portion of the windshield assembly 40 can be easily accommodated in the groove 32. The work for mounting the windshield assembly 40 on the vehicle body frame 2 can be easily performed.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention. For example, the frame upper cover section and the dash cover section may not be separate members. In the present invention, the frame upper cover section may include the dash cover section.

Although in the above-described embodiment, the discharge openings through which the water in the groove is discharged is disposed forward of the groove, the locations of the discharge openings are not limited to this. For example, the openings through which the cabin frame support parts 13 pass, which are provided at right and left end portions of the groove, may serve as the discharge openings.

What is claimed is:

1. A utility vehicle comprising:
    a vehicle body frame including:
        a pair of right and left side frame sections extending in a forward and rearward direction, on right and left sides of a riding space where a driver seat and a passenger seat are provided;
        a cabin frame section surrounding the riding space at a location that is above the pair of right and left side frame sections;
        a cross frame section extending in a rightward and leftward direction at a location that is forward of the driver seat and the passenger seat and connecting the pair of right and left side frame sections to each other; and
        a front frame section supporting a hood at a location that is forward of the cross frame section;
    a frame upper cover section disposed rearward of the hood and covering the cross frame section from above; and a windshield assembly which is detachably mountable on the vehicle body frame, at a location that is forward of the driver seat and the passenger seat, wherein a groove extending in the rightward and leftward direction is provided in an upper surface of the frame upper cover section, wherein a lower end portion of the windshield assembly is disposed at the groove, and wherein the frame upper cover section is provided with a discharge part including a discharge opening through which water in the groove is discharged to a region that is below the frame upper cover section.

2. The utility vehicle according to claim 1, wherein the groove includes a front wall, a rear wall, and a bottom wall, the front wall and the rear wall facing each other in the forward and rearward direction, the bottom wall connecting a lower end portion of the front wall and a lower end portion of the rear wall to each other, and wherein the bottom wall is inclined in a downward direction toward the discharge part.

3. The utility vehicle according to claim 1, wherein the discharge part includes a discharge passage extending from the groove to the discharge opening, and wherein the discharge opening is disposed at a location that is closer to a center in the rightward and leftward direction than a right or left end of the groove and that is forward of the groove.

4. The utility vehicle according to claim 3, wherein the discharge opening overlaps with a space where a suspending device connecting a front wheel to the front frame section is accommodated, in a plan view.

5. The utility vehicle according to claim 1, wherein the groove includes a front wall, a rear wall, and a bottom wall, the front wall and the rear wall facing each other in the forward and rearward direction, the bottom wall connecting a lower end portion of the front wall and a lower end portion of the rear wall to each other, wherein the windshield assembly includes:
a transparent windshield member
a lower seal covering a lower edge of the transparent windshield member; and
a plurality of clamps which grip and clamp the cabin frame section, and wherein the windshield assembly is mounted on the vehicle body frame in such a way that the plurality of clamps grip and clamp the cabin frame section in a state in which the lower seal is in contact with the rear wall of the groove, from a front.

6. A utility vehicle comprising:
a vehicle body frame including:
a pair of right and left side frame sections extending in a forward and rearward direction, on right and left sides of a riding space where a driver seat and a passenger seat are provided;
a cabin frame section surrounding the riding space at a location that is above the pair of right and left side frame sections;
a cross frame section extending in a rightward and leftward direction at a location that is forward of the driver seat and the passenger seat and connecting the pair of right and left side frame sections to each other; and
a front frame section supporting a hood at a location that is forward of the cross frame section;
a frame upper cover section disposed rearward of the hood and covering the cross frame section from above; and
a windshield assembly which is detachably mountable on the vehicle body frame, at a location that is forward of the driver seat and the passenger seat, wherein a groove extending in the rightward and leftward direction is provided in an upper surface of the frame upper cover section, wherein a lower end portion of the windshield assembly is disposed at the groove, wherein the windshield assembly includes a transparent windshield member, and a lower seal covering a lower edge of the transparent windshield member, and wherein the lower seal includes a stress mitigation structure for mitigating a stress generated when the lower seal contacts a wall surface forming the groove, the stress mitigation structure being elastically deformable by the stress applied thereto.

7. The utility vehicle according to claim 6, wherein the stress mitigation structure includes at least one tubular part which has a ring shape in a side view, and wherein when the windshield assembly is mounted on the vehicle body frame, the tubular part of the stress mitigation structure is deformed by the stress applied by the groove to mitigate the stress.

8. A utility vehicle comprising:
a vehicle body frame including:
a pair of right and left side frame sections extending in a forward and rearward direction, on right and left sides of a riding space where a driver seat and a passenger seat are provided;
a cabin frame section surrounding the riding space at a location that is above the pair of right and left side frame sections;
a cross frame section extending in a rightward and leftward direction at a location that is forward of the driver seat and the passenger seat and connecting the pair of right and left side frame sections to each other; and
a front frame section supporting a hood at a location that is forward of the cross frame section;
a frame upper cover section disposed rearward of the hood and covering the cross frame section from above; and
a windshield assembly which is detachably mountable on the vehicle body frame, at a location that is forward of the driver seat and the passenger seat, wherein a groove extending in the rightward and leftward direction is provided in an upper surface of the frame upper cover section, wherein a lower end portion of the windshield assembly is disposed at the groove, wherein the groove includes a front wall, a rear wall, and a bottom wall, the front wall and the rear wall facing each other in the forward and rearward direction, the bottom wall connecting a lower end portion of the front wall and a lower end portion of the rear wall to each other, wherein the windshield assembly includes:
a transparent windshield member;
a lower seal covering a lower edge of the transparent windshield member; and a plurality of clamps which grip and clamp the cabin frame section, wherein the windshield assembly is mounted on the vehicle body frame in such a way that the plurality of clamps grip and clamp the cabin frame section in a state in which the lower seal is in contact with the rear wall of the groove, from a front, and wherein a dimension in the forward and rearward direction, of the groove, is larger than a dimension in the forward and rearward direction, of the lower seal, and a clearance is provided between the lower seal and the front wall of the groove, in a state in which the lower seal is in contact with the rear wall of the groove.

\* \* \* \* \*